United States Patent
Folkesson et al.

(10) Patent No.: US 7,025,305 B2
(45) Date of Patent: Apr. 11, 2006

(54) AIRCRAFT PANEL

(75) Inventors: Mats Folkesson, Linköping (SE); Stefan Thuresson, Motala (SE)

(73) Assignee: Saab AB, Linköping (SE)

( * ) Notice: Subject to any disclaimer, the term of this patent is extended or adjusted under 35 U.S.C. 154(b) by 0 days.

(21) Appl. No.: 10/479,800

(22) PCT Filed: Apr. 30, 2002

(86) PCT No.: PCT/SE02/00843

§ 371 (c)(1),
(2), (4) Date: Dec. 5, 2003

(87) PCT Pub. No.: WO02/098734

PCT Pub. Date: Dec. 12, 2002

(65) Prior Publication Data

US 2004/0155148 A1    Aug. 12, 2004

(30) Foreign Application Priority Data

Jun. 7, 2001    (SE) ..................... 0102083

(51) Int. Cl.
*B64C 1/06* (2006.01)
(52) U.S. Cl. .............. 244/117 R; 244/123.1; 244/132
(58) Field of Classification Search ........... 244/117 R, 244/119, 123, 131, 132, 133, 123.1
See application file for complete search history.

(56) References Cited

U.S. PATENT DOCUMENTS

| | | | |
|---|---|---|---|
| 2,997,262 A * | 8/1961 | Kirk et al. ................. 244/123 |
| 3,020,986 A * | 2/1962 | Kirk et al. ................. 52/793.1 |
| 3,135,486 A * | 6/1964 | Wing ......................... 244/123 |
| 3,146,148 A * | 8/1964 | Mitchella et al. ........... 156/382 |
| 3,816,952 A * | 6/1974 | Niebyski et al. .............. 75/415 |
| 4,032,683 A | 6/1977 | Coale |
| 4,038,118 A * | 7/1977 | James ........................ 156/143 |
| 4,086,378 A * | 4/1978 | Kam et al. ................. 428/34.5 |
| 4,206,895 A * | 6/1980 | Olez ......................... 244/123 |
| 4,416,349 A * | 11/1983 | Jacobs ....................... 181/208 |
| 4,498,325 A | 2/1985 | Reccius et al. |
| 4,674,712 A * | 6/1987 | Whitener et al. ........... 244/119 |
| 4,751,979 A * | 6/1988 | Wiseman .................... 181/213 |
| 5,242,523 A * | 9/1993 | Willden et al. ............. 156/285 |
| 5,288,538 A * | 2/1994 | Spears ........................ 428/116 |
| 5,735,486 A | 4/1998 | Piening et al. |
| 6,085,965 A * | 7/2000 | Schwartz et al. ........... 228/190 |
| 6,114,050 A * | 9/2000 | Westre et al. ............... 428/608 |

FOREIGN PATENT DOCUMENTS

DE    19715529    8/1998

* cited by examiner

*Primary Examiner*—Galen Barefoot
(74) *Attorney, Agent, or Firm*—Swidler Berlin LLP

(57) ABSTRACT

An aircraft panel comprising a sandwich construction with an outer skin portion of high strength material, an inner portion of high strength material and an intermediate core material. The core material includes areas with low density core material and a reinforcement grid of high strength material, with longitudinal and transversal grid members.

6 Claims, 2 Drawing Sheets

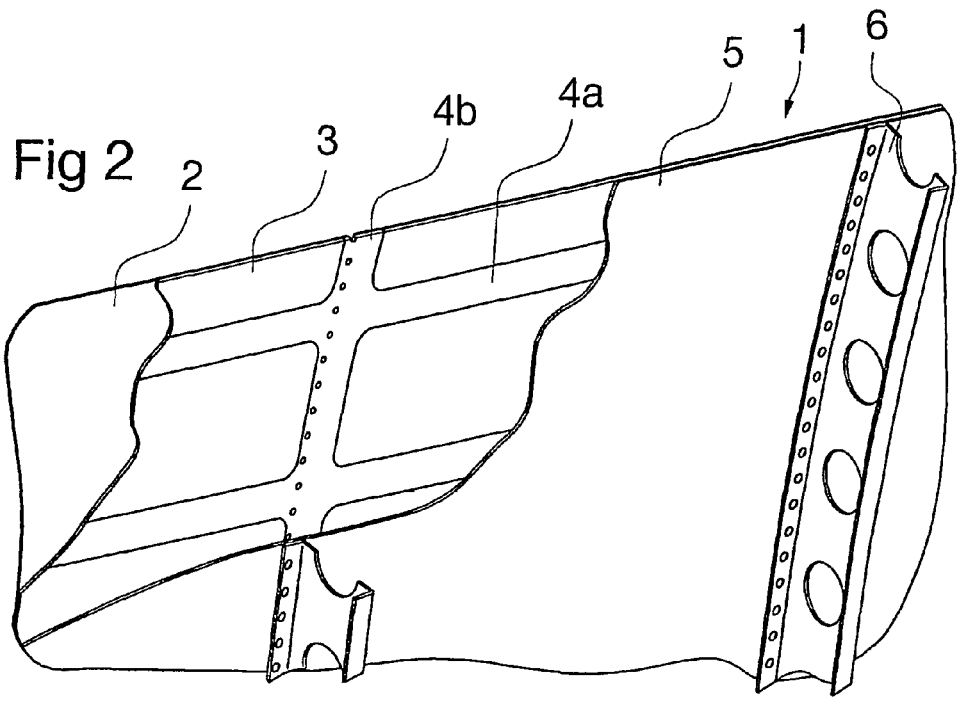
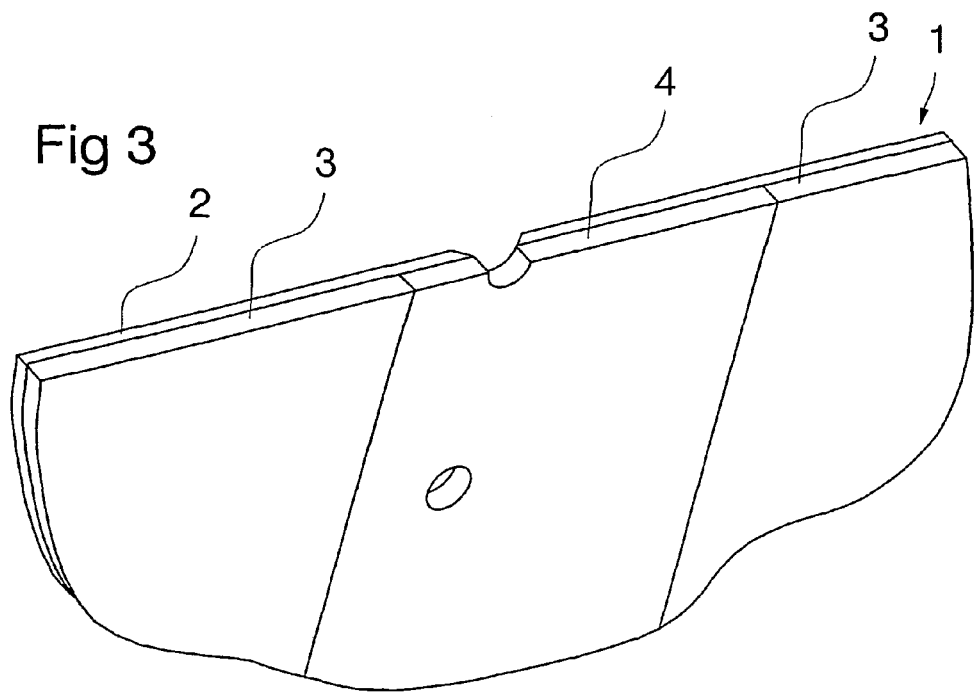

AIRCRAFT PANEL

BACKGROUND OF THE INVENTION

The present invention relates to an aircraft panel and in particular to an aircraft fuselage skin panel comprising a sandwich construction with an outer skin portion of high strength material, an inner skin portion of high strength material and an intermediate core material.

Aircraft, whether military or civil, are subjected to a high degree of stress and need to comply with stated aircraft regulations. Nevertheless, their manufacture must not involve excessive cost. These somewhat contradictory criteria apply in particular to the manufacture of curved skin panels used for fuselage, wings and other part of the aircraft where lightweight materials and simple manufacturing methods are important to keep the cost on an acceptable level.

Today skin panel surfaces on a modern aircraft are supported by one or more of the following methods:
  frames
  stringers
  honeycomb sandwich Traditional fuselage skin panels are reinforced with circumferential frames and longitudinal stringers. U.S. Pat. No. 4,498,325 discloses a typical fuselage skin panel with circumferential frames and longitudinal stringers. The combination of frames and stringers is used to give fuselage vessel the required stiffness and the sufficient amount of material to sustain all aircraft loading both from a static and from a fatigue point of view. For the stringer elements in particular, the main purpose is to divide the skin panel surface in an optimal configuration so that deformation of the surface is avoided. The stringers also contribute to preventing cracks from spreading in the skin panel.

Considerable disadvantages exist however in the present design which requires installation of the stringers and frames. Manufacturing of stringers with different geometry is very expensive. Another disadvantage is that stringer installation by riveting is time-consuming and expensive. The method causes a great number of holes through the outer skin, which always increases the potential for corrosion and fatigue problems. Another concern is the intersection where the stringers passes the frames. In the Saab 340 and Saab 2000 project, the frames have cut-outs for the stringers, which decreases the stiffness of the frames. In other solutions, clips are used in the intersection between the stringers and the frames to connect the frame to the outer skin. A problem with this solution is that it increases the complexity in the. Other techniques for stringer installation may reduce some of these disadvantages but are still time-consuming and difficult.

Test with new composite designs are on-going in a number of companies. The composite solutions have a potential to lower the weight significantly because of the unique tailoring capacity. However, there are some major concerns regarding the use of composites in cabin structures that remains to be solved. The epoxy resins, that are used for structural applications, do not meet the Fire, Toxicity and Smoke (FTS) requirements. Furthermore, the crash worthiness requirements are very difficult to meet due to the composites high degree of brittleness. A skin panel manufactured of carbon fiber would not absorb the energy to the same extent as an aluminum panel. A problem with known lightweight designs is that they have proven to be more sensitive to damage and more difficult to repair and maintain. Both these qualities provide for reluctance among the aircraft operators to adopt the new design solutions. This will probably cause more structural break-up and thereby less protection for the passengers unless new composite designs will emerge.

It would therefore be highly desirable to develop new panel structures with reduced weight and increased cost efficiency in the manufacturing.

SUMMARY OF THE INVENTION

The above and other objects are provided by an aircraft panel comprising a sandwich construction with an outer skin portion of high strength material, an inner skin portion of high strength material and an intermediate core material. The core material includes areas with low density core material and a reinforcement grid of high strength material, with longitudinal and transversal grid members.

In one embodiment the core material includes a lightweight aluminum foam core and a reinforcement grid of aluminum with longitudinal and transversal grid members.

In another embodiment, the skin panel comprises an outer aluminum skin, an intermediate aluminum reinforcement panel, a lightweight foam core and an inner aluminum skin. The intermediate aluminum reinforcement panel and the lightweight foam core are distance materials that makes the panel act as a sandwich construction. The stringers are integrated in the intermediate aluminum reinforcement grid as the longitudinal grid members and can among other things serve as crack arrest devices.

The inventive embodiments are arranged to give the fuselage vessel the required stiffness and the sufficient amount of material to sustain all aircraft loading both from static and from fatigue point of view and to support and provide fixing points for frames within the aircraft fuselage.

A major advantage with the inventive concept is that stringer manufacturing and installation costs can be avoided. Furthermore, the frames for the new skin panel do not need any weakening cut-outs for the stringers. The new panel will attain the same or lower weight than present design solutions.

BRIEF DESCRIPTION OF THE DRAWINGS

The various advantages of the present invention will become appearent to one skilled in the art by reading the following specification and subjoined claims and by referencing the following drawings in which:

FIG. 2 is a fragmentary elevational view of an inside surface portion of the inventive aircraft panel with integrated stringers FIG. 3 is an enlarged view of the panel in FIG. 2.

DESCRIPTION OF PREFERRED EMBODIMENTS

Figure 1:
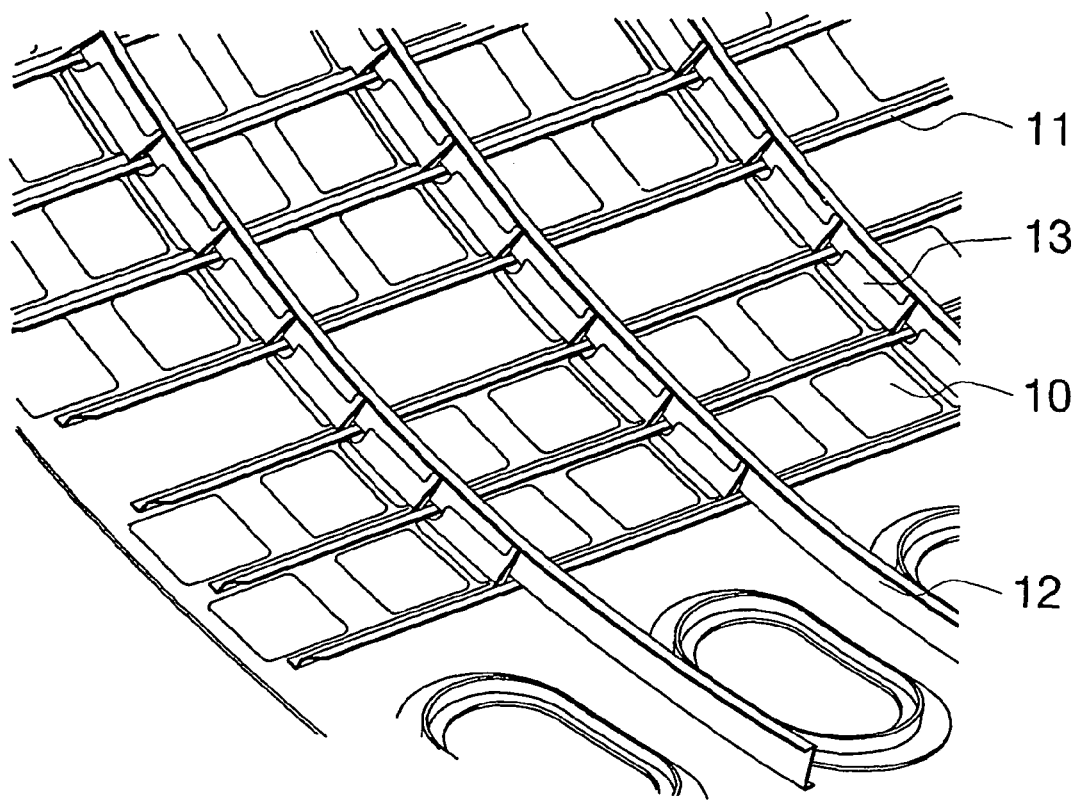
FIG. 1 is an elevational view of an inside surface portion of a traditional aircraft fuselage with stringers and frame

Referring to FIG. 1, there is shown a traditional fuselage skin panel reinforced with circumferential frames 12 and longitudinal stringers 11. Clips 13 are used between each stringer 11 to connect each frame 12 to the outer skin 10. The clips 13 are riveted to the skin 10 and to the frame 12, which is a very expensive and time-consuming attachment.

Referring to FIG. 2 there is shown an aircraft panel 1 comprising a sandwich construction with an outer skin portion 2 of high strength material, an inner skin portion 5 of high strength material and an intermediate core material.

The outer skin portion and inner skin portion are preferably both made of aluminum, which is well suited for this purpose both from a cost and crash worthiness aspect. Embodiments where a different high strength material is used for one or both skin portions are also possible. The core material comprises a distance material that makes the panel act as a damage tolerant sandwich construction. This distance material includes areas 3 with low density core material surrounded by a reinforcement grid 4 of high strength material with longitudinal grid members 4a and transversal grid members 4b. In one embodiment a plastic foam is used for the low density core material. An aluminium foam may also be used. The reinforcement grid 4 is preferably made of aluminium.

Referring to FIG. 3 there is shown a partial view of the aircraft panel 1 from FIG. 2. In FIG. 3, the reinforcement grid 4 and the areas 3 with low density core material have been exposed in order to provide a better understanding of the structure of the intermediate core material. The intermediate core material is surrounded from both sides with an outer skin portion 2 and an inner skin portion 5 as shown in FIG. 2.

The reinforcement grid 4 including the inner and outer skin portions increase the buckling capability of the whole skin panel. The transversal grid members are arranged to correspond to the intended position of frames 6. In the embodiment shown in FIG. 2, the reinforcement grid is symmetric with the longitudinal grid members parallel and arranged at equal distance from each other. The intermediate reinforcement grid can easily be optimized to new patterns along the fuselage length depending on the load levels. Increased edge thickness around the panel facilitates the joining conditions to the next panel.

The longitudinal grid members 4a correspond to the stringers used in previous designs of aircraft fuselage panels and contribute to sustain longitudinal loads in a pressurized vessel and to function as crack arrest members. In the circumferential direction, the transversal grid members 4b will function as longitudinal crack arrest members. However, circumferential frames 6 are needed to cope with general stability behavior and other installations in the aircraft and cannot be replaced with the transversal grid members 4b. The circumferential frames 6 are attached to the skin panel by a number of fasteners through the transversal grid members 4b. If the crack arrest feature is introduced longitudinally, the frames 6 may be made thinner and thereby lighter than in the previous solutions. The total amount of material for this new panel construction does not exceed the material required for the previous stringer solution.

The intermediate aluminum reinforcement improves the damage tolerance characteristics in terms of residual strength capability and crack propagation. The panel has a restraining effect on the crack propagation due to the higher panel stiffness and consequently reduced bulging effects. The intermediate aluminum reinforcement provides for a more efficient crack arrest device The new design provides the possibility to omit the internal stringers shown in FIG. 1 without compromising the field stability stiffness in the panels. The circumferential frames 6 are attached to the skin panel 1 by a number of fasteners and the transversal grid members 4b should therefore be dimensioned to allow at least one row of fasteners.

The frames can be riveted directly to the transversal grid members and does not need any weakening cut-outs for the stringers.

Increased skin thickness due to the sandwich construction will facilitate the fastener selection to install the frames. The new skin panel will have a positive temperature insulating characteristic and will also improve the noise insulating characteristic. This will provide a possibility for reduced weight in the normal cabin insulation or better noise conditions within the cabin.

Those skilled in the art can appreciate from the foregoing description that the teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

The invention claimed is:

1. An aircraft fuselage skin panel comprising a sandwich construction with an outer skin portion of high strength material, an inner skin portion of high strength material and an intermediate core material, wherein the core material includes areas with low density core material and a reinforcement grid of high strength material, the reinforcement grid of high strength material including a plurality of axially aligned longitudinal grid members dispersed within the outer ends of the core material for the aircraft panel and a plurality of transverse grid members, wherein a set of circumferential frames is attached to the aircraft fuselage skin panel and each circumferential frame in the set of circumferential frames attaches to the aircraft fuselage skin panel by using a set of fasteners extending through at least one of the plurality of transverse grid members.

2. The aircraft panel in accordance with claim 1, wherein the high strength material is aluminum.

3. The aircraft panel in accordance with claim 1, wherein the low density core material is a lightweight plastic foam.

4. The aircraft panel in accordance with claim 1, wherein the low density core material is a lightweight aluminum foam.

5. The aircraft panel in accordance with claim 1, wherein the transverse grid members are arranged to support and provide fixing points for frames.

6. An aircraft fuselage skin panel comprising a sandwich construction with an outer aluminum slain portion, an inner aluminum skin portion and an intermediate core material, wherein the core material includes areas with lightweight plastic foam and a reinforcement grid of aluminum the reinforcement grid of high strength material including a plurality of axially aligned longitudinal grid members dispersed within the outer ends of the core material for the aircraft panel and a plurality of transverse grid members and that the core material, the inner and outer skin form a sandwich panel, wherein a set of circumferential frames is attached to the aircraft fuselage skin panel and each circumferential frame in the set of circumferential frames attaches to the aircraft fuselage skin panel by using a set of fasteners extending through at least one of the plurality of transverse grid members.

* * * * *